April 29, 1969 W. J. THOMPSON 3,441,869

COAXIAL CAPACITOR

Filed April 20, 1967 Sheet 1 of 3

INVENTOR
W. J. THOMPSON
BY [signature]
ATTORNEY

United States Patent Office 3,441,869
Patented Apr. 29, 1969

3,441,869

COAXIAL CAPACITOR

William J. Thompson, Mountain Lakes, N.J., assignor to Bell Telephone Laboratories, Incorporated, Murray Hill, N.J., a corporation of New York Filed Apr. 20, 1967, Ser. No. 632,384
Int. Cl. H03f 1/42
U.S. Cl. 330—199 1 Claim

ABSTRACT OF THE DISCLOSURE

In a submarine cable repeater a four terminal coaxial capacitor is employed to minimize the transfer of energy from currents in the outer conductor branch to the transverse signal path of the repeater's coaxial structure. Additionally, the coaxial capacitor is provided with a third foil electrode over the basic structure so that the outer conductor branch is bypassed to local ground with a minimum of effective series inductance.

BACKGROUND OF THE INVENTION

*Field of the invention*

This invention relates to coaxial capacitor structures and more particularly to the employment of such structures in submarine cable repeater circuits.

*Description of the prior art*

In certain transmission systems, such as submarine cables for telephone systems for example, operating energy is supplied to a plurality of repeaters from the system terminals by way of the same conductors that are employed to supply signal energy to the repeaters. The operating energy is typically a direct current or an alternating current at a frequency which is much lower than the signal frequencies to be amplified in the repeaters. Accordingly, impedance means have been utilized to separate the signal frequency currents from the power frequency currents at each repeater in order that the signal and power energies may be applied to the proper portions of the repeater.

Analysis of typical prior art repeaters indicates the presence of an undesirable level of feedback which results primarily from the series inductance in the path between the sea and amplifier grounds. It is known that this inductance can be effectively eliminated by making the signal path a completely coaxial structure in which the outer conductor is used to connect the sea and amplifier grounds. Additionally, however, a D.C. blocking capacitor is required in this ground path and a blocking capacitor of conventional structure introduces the very inductance and the attendant feedback that the coaxial signal path arrangement seeks to avoid.

SUMMARY OF THE INVENTION

In accordance with the principles of the invention, the D.C. blocking capacitor that connects the sea and repeater grounds of a submarine cable repeater is coaxial in construction. A coaxial capacitor of this type differs from a conventional extended foil capacitor in that the foils surround and are coaxial with a central conductor. The nature of the two-port transmission properties of the coaxial capacitors is such that the inductance in the outer conductor branch matches exactly the mutual inductance between that branch and the inner conductor branch. As a result, any current flowing in the outer conductor branch produces an inductive voltage drop in that branch and by mutual inductance induces an exactly equal voltage in the center conductor branch. The polarity of these voltages causes mutual cancellation in the transverse path so that no energy is transferred to the coaxial circuit and consequently, crosstalk is reduced substantially.

Another aspect of the invention relates to the capacitor that is typically employed between the inner and the outer containers of a submarine cable to reduce crosstalk caused by stray series inductances. Conventionally, this capacitor is a relatively expensive component. In accordance with the invention, however, the cost can be reduced substantially by replacing this intercontainer capacitor with a capacitor formed by applying a third foil electrode around the coaxial filter capacitor described above.

DETAILED DESCRIPTION

Figure 1:
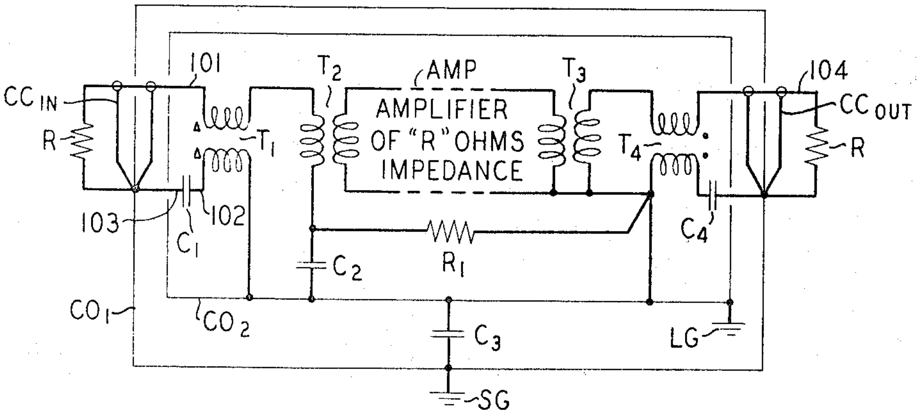
FIG. 1 is a simplified schematic circuit diagram of a submarine cable repeater circuit employing conventional capacitors.

A clear understanding of the principles of the invention in terms of a specific illustrative embodiment, such as a submarine cable repeater circuit, requires some familiarity with the structure and function of a conventional submarine cable repeater and its associated circuitry, including its power separation filter. Such a conventional circuit is shown in FIG. 1. This circuit includes an input coaxial cable $CC_{in}$, an amplifier $A_1$ of "R" ohms impedance and an output coaxial cable $CC_{out}$. The resistors R—R at the input and output terminals represent the input and output impedances respectively of the coaxial cable.

The operation of the circuit including the function of various individual circuit components may be described more readily by tracing the power and signal paths. The D.C. power path extends from the center conductor 101 of the cable $CC_{in}$ on the left through the D.C. load represented by resistor $R_1$ and out to the center conductor 104 of the cable $CC_{out}$ on the right. An A.C. signal starting at the input coaxial cable $CC_{in}$ passes through a longitudinal suppressor transformer $T_1$, a ground isolating transformer $T_2$, the amplifier $A_1$, a second isolating transformer $T_3$ and a second longitudinal suppressor transformer $T_4$ to the output coaxial cable $CC_{out}$ on the right. Capacitors $C_1$ and $C_4$ are conventional high voltage D.C. blocking capacitors, and capacitor $C_2$ is a high capacitance low voltage blocking capacitor. Capacitor $C_3$ represents the capacitance between the repeater outer container $CO_1$ and the repeater inner container $CO_2$ plus any added physical capacitor.

Because of the impedances of the blocking capacitors $C_1$ and $C_4$ and possibly also because of other imperfections that are necessarily present in any practical circuit of this type, there is an unwanted feedback path from the output of amplifier $A_1$ around to its input. To prevent objectionable transmission degradation within the normal signal band of the repeater, it is desirable that the loss in this feedback path be approximately 70 db more than the amplifier gain. Additionally, in order to guard against amplifier sing, the loss in this path should be about 15 db more than the amplifier gain at all frequencies where the amplifier has gain.

Figure 1A:
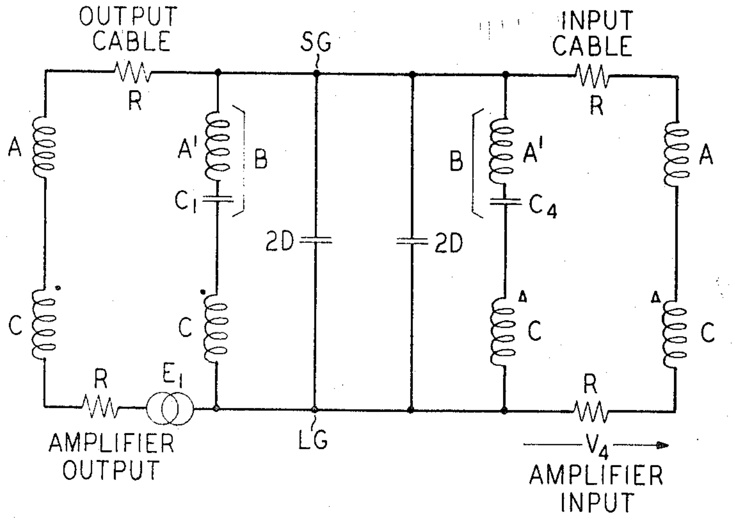
FIG. 1A is a simplified schematic circuit diagram of the feedback path of the circuit shown in FIG. 1.

The circuit of FIG. 1 may be redrawn in the form shown in FIG. 1A to include only those elements that are important in the A.C. feedback path from the amplifier output to the amplifier input. For convenience, the various circuit impedances are represented by the capital letters A, B, C, D and R, where each impedance results from one or more identifiable source in the circuit. For example, the longitudinal suppressor transformer $T_1$ of FIG. 1 has been replaced by an equivalent circuit of two 100 percent coupled inductors each of impedance C, plus two uncoupled series inductors designated A and A' to account for the lack of perfect coupling between the two windings. The polarity of the coupled inductors is as indicated. One of these series inductances A includes wiring inductance. The other series inductance A', which also includes wiring inductance, is combined with the impedance of the blocking capacitor $C_1$ to constitute a total impedance B. The impedance D is the impedance of the capacitor $C_3$ and for the convenience of later analysis is shown as two parallel impedances of 2D each. The cable and amplifier impedances are shown as R.

The effects on transmission of the interwinding capacitances of the transformers $T_1$ and $T_4$ either are or can be made relatively small. Accordingly, in order to simplify the analysis, these capacitances have been omitted from the equivalent circuit shown in FIG. 1A.

The ratio of amplifier input $V_4$ to amplifier output $E_1$ may be expressed as follows, assuming that A, B, C, D and R are the impedances indicated above and further that the transformers are ideal:

$$\frac{V_4}{E_1}=\frac{B^2DR}{(A+B+2R)^2(B+C+D)^2-D^2(A+B+2R)^2-2B^2(A+B+2R)(B+C+D)+B^4} \quad (1)$$

By factoring, the voltage ratio can be written as $$\frac{V_4}{E_1}=\frac{1}{2}\alpha\beta \quad (2)$$

where $$\alpha=\frac{+2BD}{(AB+2R)(B+C+2D)-B^2} \quad (3)$$

and $$\beta=\frac{+BR}{(A+B+2R)(B+C)-B^2} \quad (4)$$

The above expression for $\alpha$ is identical with the expression for the ratio $V_T/E_1$ where $V_T$ is the Thevenin voltage of the network to the left of center resulting from the applied voltage $E_1$. The above $\beta$ expression is identical with the expression for the ratio $V_4/E_T$ for the right half network where $V_4$ results from a voltage $E_T$ applied between the sea ground SG and local ground LG. The one-half term in the expression $\frac{1}{2}\alpha\beta$ is needed to account for the voltage loss when the Thevenin voltage $V_T$ of the left half works into the matched load of the right half.

From the circuit analysis standpoint there may be little value in presenting the transmission expression in terms of $\alpha$ and $\beta$. These terms are particularly convenient, however, in experimental work where it is found easier to measure the individual voltage ratios $\alpha$ and $\beta$ than it is to measure the ratio of $V_4/E_1$.

As noted above and as shown in the expressions for $\alpha$ and $\beta$, the feedback transmission can be made small by making the impedances B and D small relative to the denominators. At high frequencies, B is due almost entirely to the uncoupled inductances contributed by the blocking capacitor, the suppressor transformer and the wiring between sea ground SG and local ground LG. To make the denominator large, only the transformer impedance C is available to the circuit designer inasmuch as its value does not affect the signal transmission from the input cable through the amplifier to the output cable. Another requirement for ensuring good signal transmission is that the wiring impedance A must be kept small compared to the impedance R.

At frequencies below the signal band, the impedance B is determined primarily by the high voltage blocking capacitor $C_1$. Although considerations of size and cost limit how small this impedance can be made, one practical way of reducing the feedback down to the frequency where the amplifier gain drops to zero is to make the transformer impedance C large relative to the capacitance impedance B.

In order to appreciate fully the effect of the impedance B, particularly that part resulting from the series inductance of capacitor $C_1$, a brief discussion of line inductive effects in general is helpful. In a transmission line one is usually concerned with only the transverse transmission, that is, current flow down one conductor and back on the other. In this case however, we are also interested in the longitudinal flow of current.

In this connection it is desirable to examine the inductive effects of both common types of lines, that is, the parallel pair type and the coaxial. Inasmuch as we are concerned primarily with performance at high frequencies, the identities listed below assume that current flow is restricted to a thin layer at the surfaces of the conductors. It is further assumed that the spacing between conductors is very much less than line length, that the line is isolated in space and that the line is electrically short.

In the Equations 5 through 9 listed below, all dimensions are in meters and the following symbols are employed:

$l$=length of the line
$r$=radius of each conductor of the parallel pair
$d$=center-to-center spacing of the parallel pair
$a$=radius of the inner conductor of the coaxial
$b$=radius of the outer conductor of the coaxial For the case of both the parallel pair and the coaxial cable, each conductor of the line has a self-inductance and the two conductors are coupled by a mutual inductance. For the parallel pair line these inductances may be expressed as follows:

$$L_r=0.2l\left[2.30\log_{10}\frac{2l}{r}-1\right]\mu\text{h.} \quad (5)$$

where $L_r$ is the self-inductance of each conductor, and $$L_{rr}=0.2l\left[2.30\log_{10}\frac{2l}{d}-1\right]\mu\text{h.} \quad (6)$$

where $L_{rr}$ is the mutual inductance between conductors.

For the coaxial line the inductances are $$L_o=0.2l\left[2.30\log_{10}\frac{2l}{b}-1\right]\mu\text{h.} \quad (7)$$

where $L_o$ is the self-inductance of the outer conductor, $$L_a=0.2l\left[2.30\log_{10}\frac{2l}{a}-1\right]\mu\text{h.} \quad (8)$$

where $L_a$ is the self-inductance of the inner conductor, and $$L_{ab}=0.2l\left[2.30\log_{10}\frac{2l}{b}-1\right]\mu\text{h.} \quad (9)$$

where $L_{ab}$ is the mutual inductance between conductors.

Figure 1B:
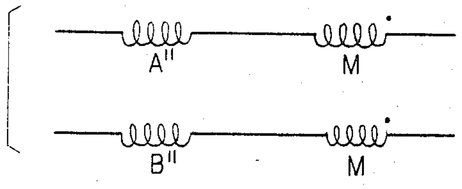
FIG. 1B is a schematic representation of a circuit equivalent for a transmission line.

Schematically, these lines can be represented by the transformer-like equivalent circuit shown in FIG. 1B in which there are two noncoupled inductors A'' and B'' and two 100 percent coupled inductors M—M.

From the foregoing inductance formulas it follows for the parallel pair line that $$A''=B''=L_r-L_{rr} \quad (10)$$

or $$A''=B''=0.460l \log_{10} d/r \ \mu\text{h.} \quad (11)$$

For the coaxial line $$A''=L_a-L_{ab} \quad (12)$$

or $$A''=0.460l \log_{10} b/a \ \mu\text{h.} \quad (13)$$

and $$B''=L_b-L_{ab} \quad (14)$$

or $$B''=\text{zero (this is for the outer conductor).} \quad (15)$$

Insofar as the principles of the invention are concerned, the most significant point which may be derived from the above analysis is that a coaxial line, regardless of dimension, has no uncoupled inductance effective in the sheath branch owing to the fact that the inductance of the sheath is exactly equal to the mutual inductance between the sheath and to the inner conductor. Consequently, a current flowing in the sheath produces a voltage drop in that branch, and the mutual inductance induces an exactly equal voltage in the center conductor branch. The polarity of these voltages is such that they cancel in the transverse path and consequently no energy is transferred. Conversely, transverse current in the coaxial line does not produce a voltage drop in its sheath. It should be noted that the voltage cancellation is not complete in the parallel pair line.

Even though the foregoing analysis of transmission lines is on an idealized basis, it follows that there should be very little high frequency feedback transmission in a submarine cable repeater circuit from uncoupled inductive effects if the entire path between sea and local terminations were of coaxial construction. In a conventional submarine cable repeater, however, the D.C. blocking capacitor constitutes a major departure from the desired coaxial construction.

Even assuming an all-coaxial construction, a certain limited amount of high frequency feedback transmission results from the less than perfect shielding of the outer conductor. Such feedback is of sufficient potential significance to warrant examination. At high frequencies the outer conductor of most coaxial lines has a thickness of several times skin depth. In an electrically short line transmitting power, the effect of imperfect shielding can be thought of as a voltage generator in the branch of the outer conductor. This voltage is proportional to the length of the line and is a function of the ratio of the skin depth to conductor thickness.

Figure 3:
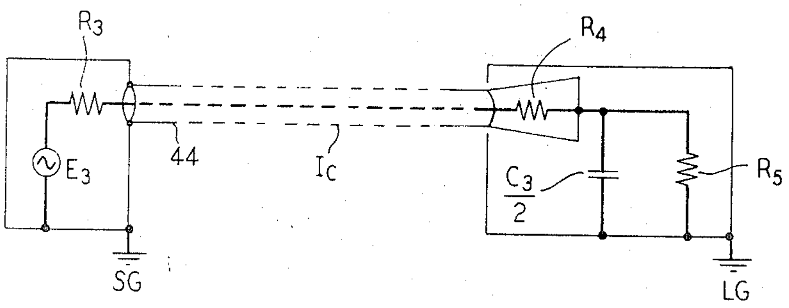
FIG. 3 is a schematic circuit diagram of a first test circuit.

In order to check the relative importance of uncoupled inductive effects and imperfect shielding, transmission tests can be made under conditions simulating the $\alpha$ transmission previously discussed. A circuit which may be employed for such tests is shown in FIG. 3 in which the generator $E_3$ having an impedance $R_3$ of 75 ohms, for example, simulates the amplifier output. The generator $E_3$ is connected through various intermediate circuits $I_C$ to the output resistor $R_4$, simulating the sea cable impedance at the output of the repeater. In the $\alpha$ transmission the open circuit voltage between the sea ground SG and the local ground LG (across the capacitor $C_3/2$) is measured. For a comparison measurement, the voltage across the capacitor $C_3/2$ in parallel with the resistor $R_5$ is taken. Resistor $R_5$ has a magnitude on the order of 75 ohms. It is found that the measured loss differs from the $\alpha$ loss at low frequencies, but above 2 mHz. where the impedance of the capacitor is controlling, there is little difference in transmission. In a test circuit illustrated in FIG. 3 the transmission is measured through a loop of about 25 inches of coaxial cable 44 between the source $E_3$ and the resistor $R_4$ simulating the sea cable. The resulting transmission is shown by curve 40 of FIG. 4A. The dip in this curve at about 6 mHz. is the result of the resonance of the loop of the cable and the capacitive termination which, more specifically, involves primarily the $B+C+2D$ term in the denominator of the $\alpha$ expression of Equation 3.

Figure 4A:
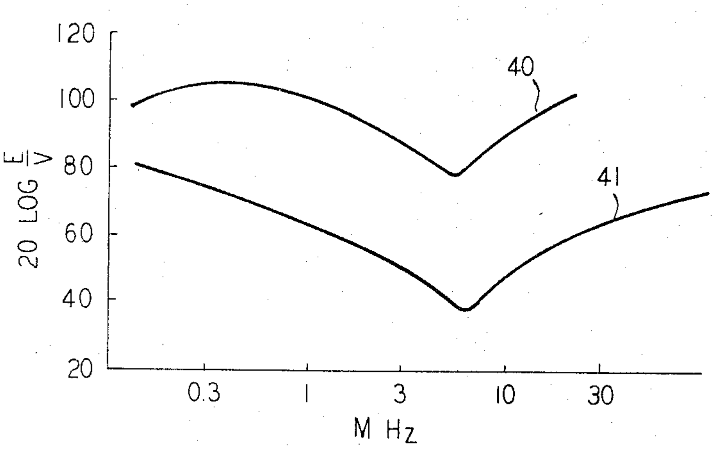
FIG. 4A is a plot of the transmisison characteristics of the test circuits shown in FIGS. 3 and 5.
Figure 5:
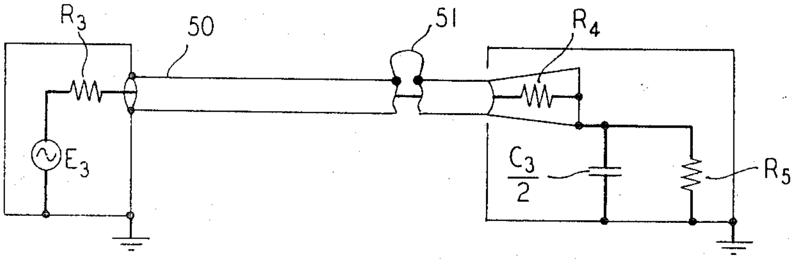
FIG. 5 is a schematic circuit diagram of a third test circuit.

In another experiment the outer conductor of the cable 50 shown in FIG. 5 is cut and reconnected through a one-half inch diameter loop of wire 51 having an inductance of approximately 0.015 $\mu$h. The resulting transmission loss which is shown by curve 41 of FIG. 4A has about 40 db less loss than the unbroken cable 44 shown in FIG. 3. It is to be noted that in this context less loss (or more feedback) is undesirable. It can thus be concluded that a very small departure from an all-coaxial construction, such as that produced by conventional capacitors, is much more important than the lack of perfect shielding of the outer conductor of the cable.

The effect of a departure from complete coaxial construction is particularly significant at higher frequencies where the capacitive reactance decreases and the reactance of any series inductance increases and becomes controlling. As indicated above, a system such as that shown in FIG. 1 employing conventional capacitors also includes some effective series inductance. In accordance with the invention, such inductance can be effectively eliminated by employing a coaxial capacitor such as that shown in FIG. 2. This conclusion follows from the property of the coaxial line previously discussed in which it was shown that there is no uncoupled inductance effective in the outer conductor of a coaxial line.

Figure 2:
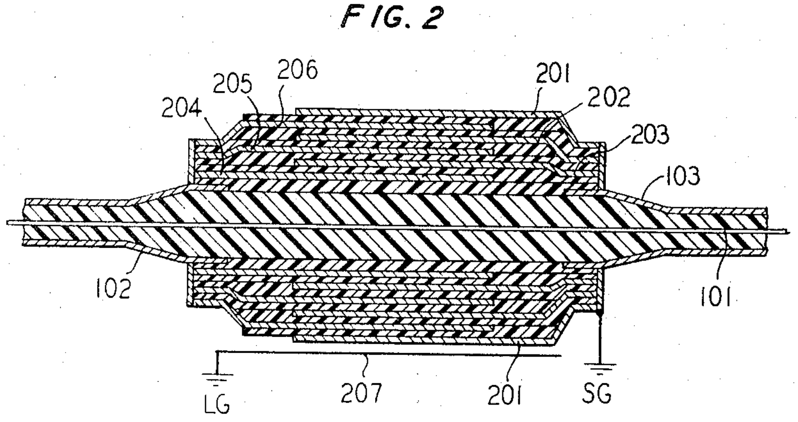
FIG. 2 is a sketch in cross section of a coaxial capacitor in accordance with the invention.

The coaxial capacitor shown in FIG. 2 which surrounds an inner coaxial conductor 101 has its foils 201 through 206 extended to effect a capacitive connection between the outer conductor 102 and the outer conductor 103. The terminals of the conventional capacitor $C_1$ of FIG. 1 are labeled 102 and 103 to show the correspondence between the similarly labeled outer conductors 102 and 103 shown in FIG. 2. The inner conductor 101 of FIG. 2 corresponds to conductor 101 of FIG. 1. The common designating characters in FIGS. 1 and 2 thus serve to indicate precisely the manner in which a coaxial capacitor in accordance with the invention is connected into a circuit of the type shown in FIG. 1. In a complete circuit in accordance with the invention, a coaxial capacitor of the type shown in FIG. 2 would also be substituted for the blocking capacitor $C_4$ shown in FIG. 1.

The coaxial capacitor shown in FIG. 2 with its completely surrounding foils is an idealized construction. A somewhat more practical capacitor from the standpoint of high voltage and high reliability may be fabricated by employing symmetrically spaced metal strips in lieu of the extended foils 201 to 206, shown in FIG. 2. The use of metal strips as opposed to completely surrounding foils also facilitates impregnating the unit. The total capacitance of the element is of course a function of the area of interleaved capacitive plates.

One additional aspect of the invention involves the auxiliary capacitive plate or foil 207, which is connected to local ground LG shown in FIG. 2, which may be utilized in lieu of the capacitor $C_3$ shown in FIG. 1. The foil 207 should preferably completely surround the inner conductor 101 and have a low impedance connection to local ground. The elimination of the capacitor $C_3$ has the primary advantage of effecting a reduction in circuit cost.

Figure 4:
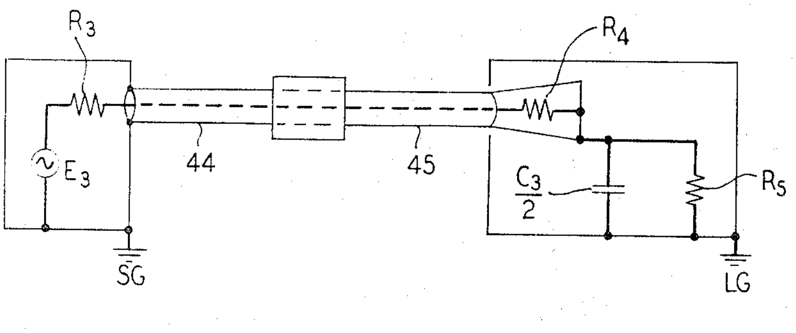
FIG. 4 is a schematic circuit diagram of a second test circuit.
Figure 5A:
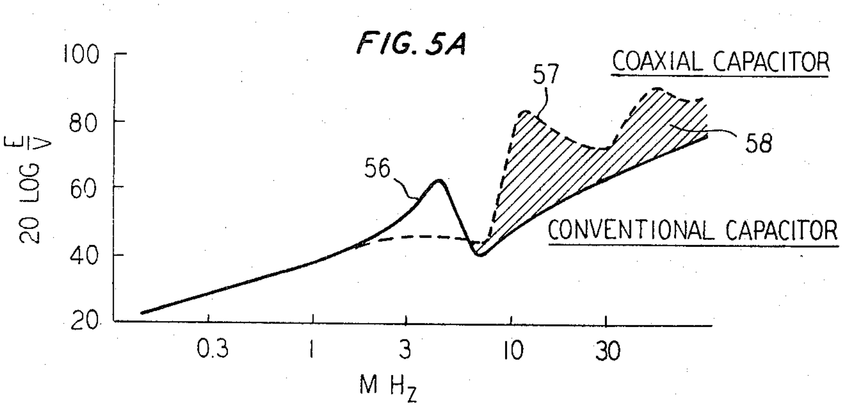
FIG. 5A is a plot of transmission characteristics of the circuit shown in FIG. 4 when utilizing a conventional capacitor and when utilizing a capacitor in accordance with the invention.

A quantitative evaluation of the effective inductance introduced by a coaxial capacitor in accordance with the invention as compared to the inductance introduced by a conventional capacitor may be conducted by employing a test circuit such as that shown in FIG. 4. Transmission measurements made with a conventional capacitor (not shown) connected in series with the outer conductors of the coaxial lines 44 and 45 produce the curve 56 shown in FIG. 5A. Similar measurements made with a coaxial capacitor of the type shown in FIG. 2 connected in series with the outer and inner conductors of the coaxial lines 44 and 45 produce the curve 57 shown in FIG. 5A. In the curve 57 the 6 mHz. transmission dips have the same cause as discussed previously. The peaks in transmission loss at 4.5 and 12 mHz. result primarily from the series resonance of the impedance B (FIG. 1A), that is, the resonance of the blocking capacitor and the uncoupled inductance effective in the outer conductor branch. The capacitors used in both tests are 0.100 mf. in magnitude and the effective uncoupled inductance for the conventional capacitor is about 0.013 $\mu$h. and for the coaxial capacitor about 0.0016 $\mu$h. The magnitude of transmission improvement over the indicated frequency band is shown by the hatched area 58.

The employment of a coaxial capacitor in accordance with the invention has been shown in a single illustrative embodiment. It is apparent, however, that a capacitor following the teachings of the invention may find effective use in a wide variety of coaxial transmission systems wherever it is desirable to employ capacitance in the outer coaxial conductor without the disadvantage of a relatively high level of associated inductance. Additionally, it is to be understood that various modifications in the structure of a coaxial capacitor in accordance with the invention may be effected by persons skilled in the art without departing from the spirit and scope of the invention.

What is claimed is:

1. A submarine cable repeater structure comprising, in combination, an input terminal and an output terminal, first and second coaxial capacitors for connecting said input and output terminals, respectively, to input and output transmission lines, respectively, each of said capacitors having an outer conductor branch including a plurality of interleaved, insulatedly separated portions and an inner conductor portion, first and second outer shield members each substantially surrounding a respective one of said capacitors in spaced capacitive relation thereto, each of said outer shield members being connectable to sea ground, and means connecting the outermost one of said interleaved insulatedly separated portions of each of said capacitors to an internal local ground, thereby substantially eliminating the transmission of unwanted feedback around said repeater by way of said capacitors.

References Cited

UNITED STATES PATENTS

| | | | |
|---|---|---|---|
| 2,812,502 | 11/1957 | Doherty | 333—12 |
| 3,085,176 | 4/1963 | Fischer | 317—260 |

JOHN KOMINSKI, *Primary Examiner.*

U.S. Cl. X.R.

179—170.2; 317—306; 333—12